US008351554B2

(12) United States Patent
Grbic et al.

(10) Patent No.: US 8,351,554 B2
(45) Date of Patent: Jan. 8, 2013

(54) SIGNAL EXTRACTION

(75) Inventors: Nedelko Grbic, Karlskrona (SE); Ingvar Claesson, Karlskrona (SE); Per Eriksson, Karlskrona (SE)

(73) Assignee: Exaudio AB, Molndal (SE)

( * ) Notice: Subject to any disclaimer, the term of this patent is extended or adjusted under 35 U.S.C. 154(b) by 1039 days.

(21) Appl. No.: 12/301,758

(22) PCT Filed: Jun. 5, 2006

(86) PCT No.: PCT/EP2006/005347

§ 371 (c)(1), (2), (4) Date: Jan. 6, 2009

(87) PCT Pub. No.: WO2007/140799

PCT Pub. Date: Dec. 13, 2007

(65) Prior Publication Data

US 2009/0257536 A1 Oct. 15, 2009

(51) Int. Cl.
*H04B 1/10* (2006.01)

(52) U.S. Cl. ........ 375/350; 375/345; 375/316; 455/307; 708/300

(58) Field of Classification Search .................. 375/350, 375/345, 316; 455/307; 708/300
See application file for complete search history.

(56) References Cited

U.S. PATENT DOCUMENTS 5,321,729 A * 6/1994 Schroder et al. .............. 375/241
6,236,731 B1 * 5/2001 Brennan et al. ............... 381/316
6,408,269 B1 6/2002 Wu et al.
7,171,008 B2 * 1/2007 Elko ............................... 381/92
7,443,917 B2 * 10/2008 Vitenberg ..................... 375/260
2001/0046268 A1 * 11/2001 Sharma ......................... 375/324
2003/0147538 A1 * 8/2003 Elko ............................... 381/92
2004/0252772 A1 * 12/2004 Renfors et al. ................ 375/260

OTHER PUBLICATIONS

Dam et al., 2004 IEEE International Conference on Acoustics, Speech, and Signal Processing IEEE Piscataway, NJ, USA, vol. 4, 2004, pp. 93-96, XP002407787.
Dam et al., 2005 International Workshop on Acoustic Echo and Noise Control, Sep. 12, 2008,—Sep. 15, 2005, pp. 77-80, XP002407788.
Araki et al., 2003 IEEE International Conference on Acoustics, Speech, and Signal Processing IEEE Piscataway, NJ, USA, vol. 5, 2003, pp. 509-512, XP002407789.
Hanada et al., TENCON 2004, IEEE Region 10 Conference Chiang Mai, Thailand Nov. 21-24, 2004, Piscataway, NJ, USA, IEEE, Nov. 21, 2004, pp. 665-668, XP010797844.

* cited by examiner

*Primary Examiner* — Kenneth Lam
(74) *Attorney, Agent, or Firm* — Birch, Stewart, Kolasch & Birch, LLP

(57) ABSTRACT

The invention relates to an adaptive method of extracting at least of desired electro magnetic wave signals, sound wave signals (40, 42), and any other signals from a mixture of signals (40, 42, 44, 46) and suppressing noise and interfering signals to produce enhanced signals (50) corresponding to desired (10) signals, and an apparatus (70) therefore. It relies on the concept of at least one of an attenuation of input signals in each sub-band for signals in such a manner that all desired (10) signals are attenuated less than noise or interfering source signals, and/or an amplification of input signals in each sub-band for source signals in such a manner that all desired (10) signals are amplified, and that they are amplified more than the noise and interfering signals.

14 Claims, 7 Drawing Sheets

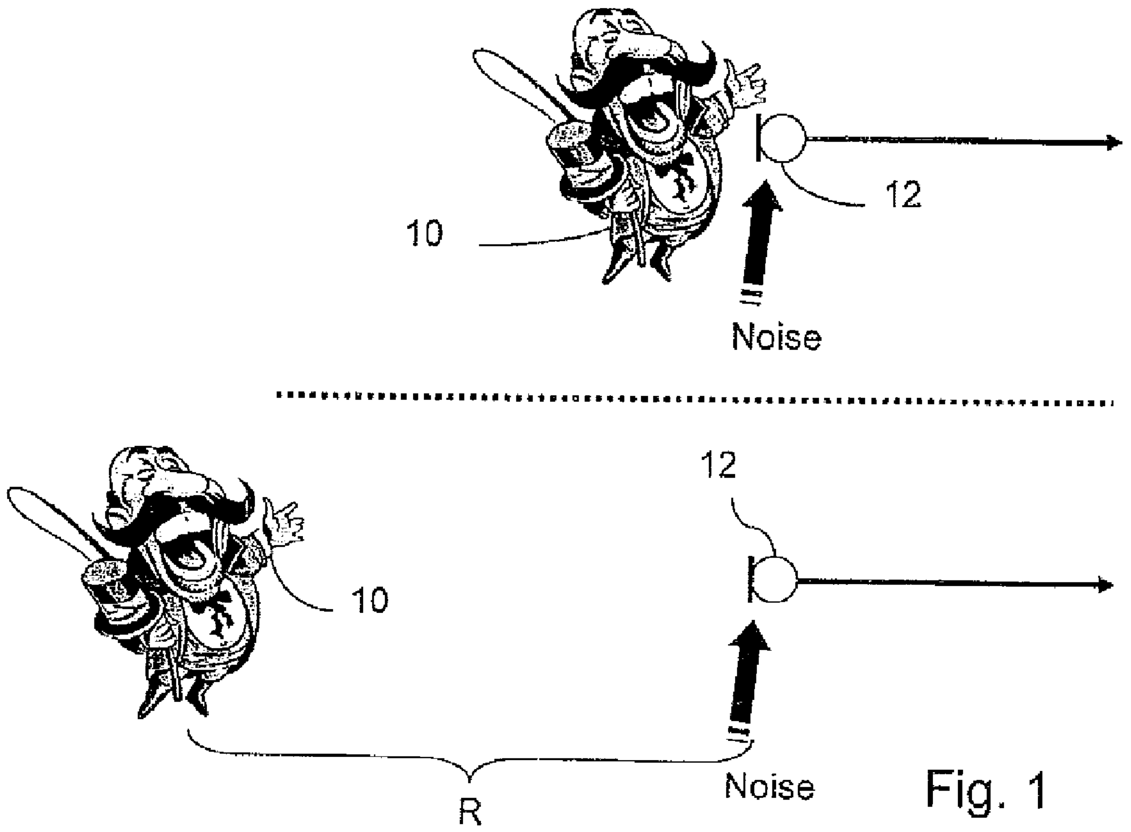
Fig. 1
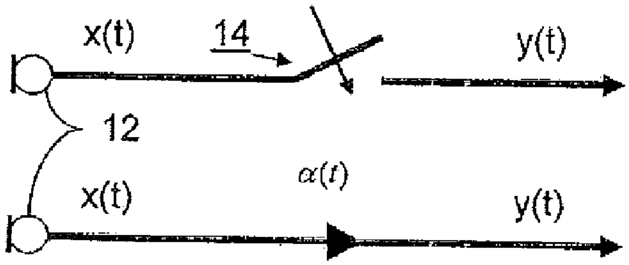
Fig. 2a
Fig. 2b
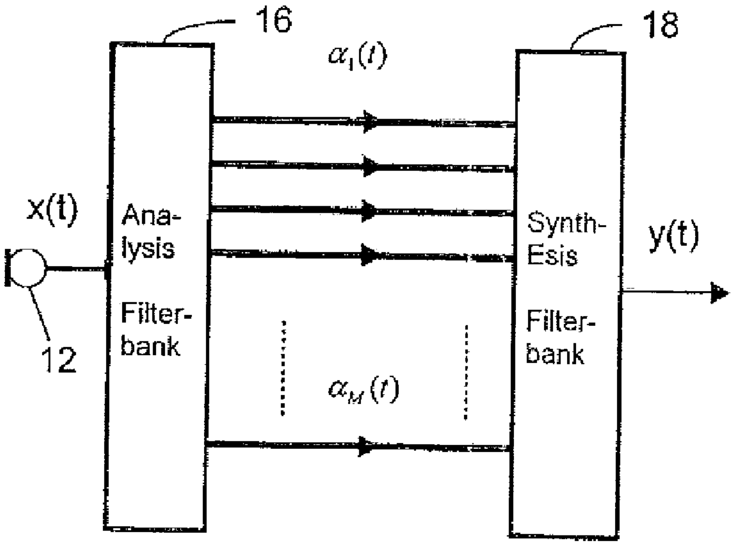
Fig. 2c $$y(n) = -\sum_{k=1}^{N} a_k y(n-k) + \sum_{k=0}^{M} b_k x(n-k)$$

SIGNAL EXTRACTION

TECHNICAL FIELD

The present invention pertains to an adaptive method of extracting at least one of desired electro magnetic wave signals, sound wave signals or any other signals and suppressing other noise and interfering signals to produce enhanced signals from a mixture of signals. Moreover, the invention sets forth an apparatus to perform the method.

BACKGROUND ART

Signal extraction (or enhancement) algorithms, in general, aim at creating favorable versions of received signals while at the same time attenuate or cancel other unwanted source signals received by a set of transducers/sensors. The algorithms may operate on single sensor data producing one or several output signals or it may operate on multiple sensor data producing one or several output signals. A signal extraction system can either be a fixed non-adaptive system that regardless of the input signal variations maintains the same properties, or it can be an adaptive system that may change its properties based on the properties of the received data. The filtering operation, when the adaptive part of the structural parameters is halted, may be either linear or non-linear. Furthermore, the operation may be dependent on the two states, signal active and signal non-active, i.e. the operation relies on signal activity detection.

Regarding for instance speech extraction, physical domains are recognized and thus have to be considered when reconstructing speech in a noisy environment. These domains pertain to time selectivity for instance appearing in speech booster/spectral subtraction/TDMA (Time Division Multiple Access) and others. The domain of frequency selectivity comprises Wiener filtering/notch filtering/FDMA (Frequency Division Multiple Access) and others. The spatial selectivity domain relates to Wiener BF (Beam Forming)/BSS (Blind Signal Separation)/MK (Maximum/Minimum Kurtosis)/GSC (Generalized Sidelobe Canceller)/LCMV (Linearly Constrained Minimum Variance)/SDMA (Space Division Multiple Access) and others. Another existing domain is the code selectivity domain including for instance CDMA (Code Division Multiple Access) method, which in fact is a combination of the above mentioned physical domain.

No scientific research or findings yet have been able to combine time selectivity, frequency selectivity, and spatial selectivity in enhancing/extracting wanted signals in a noisy environment. Especially, such a combination has not been carried out without pre-assumptions or special knowledge about the environment where signal extraction is accomplished. Hence, fully adaptive automatic signal extraction would be appreciated by those who are skilled in the art.

Especially the following problems are encountered by fully automatic signal extraction; sensor and source inter-geometry is unknown and changing; the number of desired sources is unknown; surrounding noise sources have unknown spectral properties; sensor characteristics are non-ideal and change due to ageing; complexity restrictions; needs to operate also in high noise scenarios.

A prior published work in the technical field of speech extraction is "BLIND SEPARATION AND BLIND DECONVOLUTION: AN INFORMATION-THEORETIC APPROACH" to Anthony J. Bell and Terrence J. Sejnowski, at Computational Neurobiology Laboratory, The Salk Institute, 10010 N. Torrey Pines Road, La Jolla, Calif. 92037, 0-7803-2431 45/95$4.00 0 1995 IEEE.

Blind separation and blind deconvolution are related problems in unsupervised learning. In blind separation, different people speaking, music etc are mixed together linearly by a matrix. Nothing is known about the sources, or the mixing process. What is received is the N superposition's of them, $x_1(t), x_2(t) \ldots, x_N(t)$. The task is thus to recover the original sources by finding a square matrix W which is a permutation of the inverse of an unknown matrix, A. The problem has also been called the 'cocktail-party' problem.

Another prior published work in the technical field of signal extraction relates to "Blind Signal Separation: Statistical Principles", JEAN-FRANCOIS CARDOSO, PROCEEDINGS OF THE IEEE, VOL. 86, NO. 10, OCTOBER 1998.

Blind signal separation (BSS) and independent component analysis (ICA) are emerging techniques of array processing and data analysis that aim to recover unobserved signals or "sources" from observed mixtures (typically, the output of an array of sensors), exploiting only the assumption of mutual independence between the signals. The weakness of the assumptions makes it a powerful approach, but it requires to venture beyond familiar second order statistics. The objectives of the paper are to review some of the approaches that have been recently developed to address this problem, to illustrate how they stem from basic principles, and to show how they relate to each other.

BSS-ICA/PCA, ICA is equivalent to nonlinear PCA, relying on output independence/de-correlation. All signal sources need to be active simultaneously, and the sensors recording the signals must equal or outnumber the signal sources. Moreover, the existing BSS and its equals are only operable in low noise environments.

Yet another prior published work in the technical field of signal extraction relates to "BLIND SEPARATION OF DISJOINT ORTHOGONAL SIGNALS: DEMIXING N SOURCES FROM 2 MIXTURES", Jourjine, A.; Rickard, S.; Yzimaz O.; Proceedings in 2000 IEEE International Conference on Acoustics, Speech, and Signal Processing, Volume 5, Page(s): 2985-2988, 5-9 Jun. 2000.

In this scientific article the authors present a novel method for blind separation of any number of sources using only two mixtures. The method applies when sources are (W-) disjoint orthogonal, that is, when the supports of the (windowed) Fourier transform of any two signals in the mixture are disjoint sets. It is shown that, for anechoic mixtures of attenuated and delayed sources, the method allows estimating the mixing parameters by clustering ratios of the time-frequency representations of the mixtures. Estimates of the mixing parameters are then used to partition the time-frequency representation of one mixture to recover the original sources. The technique is valid even in the case when the number of sources is larger than the number of mixtures. The general results are verified on both speech and wireless signals. Sample sound files can be found at: http://eleceng.ucd.ie/~srickard/bss.html.

BSS-Disjoint Orthogonal de-mixing relies on non-overlapping time-frequency energy where the number of sensors>< the number of sources. It introduces musical tones, i.e. severe distortion of the signals, and operates only in low noise environments.

BSS-Joint cumulant diagonalization, diagonalizes higher order cumulant matrices, and the sensors have to outnumber or equal the number of sources. A problem related to it is its slow convergence as well as it only operates in low noise environments.

A still further prior published work in the technical field of signal extraction relates to "ROBUST SPEECH RECOGNITION IN A HIGH INTERFERENCE REAL ROOM ENVI- RONMENT USING BLIND SPEECH EXTRACTION", Koutras, A.; Dermatas, E.; Proceedings in 2002 $14^{th}$ International Conference on Digital Signal Processing, Volume 1, Page(s): 167-171, 2002.

This paper presents a novel Blind Signal Extraction (BSE) method for robust speech recognition in a real room environment under the coexistence of simultaneous interfering non-speech sources. The proposed method is capable of extracting the target speaker's voice based on a maximum kurtosis criterion. Extensive phoneme recognition experiments have proved the proposed network's efficiency when used in a real-life situation of a talking speaker with the coexistence of various non-speech sources (e.g. music and noise), achieving a phoneme recognition improvement of about 23%, especially under high interference. Furthermore, comparison of the proposed network to known Blind Source Separation (BSS) networks, commonly used in similar situations, showed lower computational complexity and better recognition accuracy of the BSE network making it ideal to be used as a front-end to existing ASR (Automatic Speech Recognition) systems.

The maximum kurtosis criterion extracts a single source with the highest kurtosis, and the number of sensors >< the number of sources. Its difficulties relate to handle several speakers, and it only operates in low noise environments.

A still further prior published work in the technical field of signal recognition relates to "Robust Adaptive Beamforming Based on the Kalman Filter", Amr El-Keyi, Thiagalingam Kirubarajan, and Alex B. Gershman, IEEE TRANSACTIONS ON SIGNAL PROCESSING, VOL. 53, NO. 8, AUGUST 2005.

The paper presents a novel approach to implement the robust minimum variance distortion-less response (MVDR) beam-former. This beam-former is based on worst-case performance optimization and has been shown to provide an excellent robustness against arbitrary but norm-bounded mismatches in the desired signal steering vector. However, the existing algorithms to solve this problem do not have direct computationally efficient online implementations. In this paper a new algorithm for the robust MVDR beam-former is developed, which is based on the constrained Kalman filter and can be implemented online with a low computational cost. The algorithm is shown to have similar performance to that of the original second-order cone programming (SOCP)-based implementation of the robust MVDR beam-former. Also presented are two improved modifications of the proposed algorithm to additionally account for non stationary environments. These modifications are based on model switching and hypothesis merging techniques that further improve the robustness of the beam-former against rapid (abrupt) environmental changes.

Blind Beam-forming relies on passive speaker localization together with conventional beam-forming (such as the MVDR) where the number of sensors >< the number of sources. A problem related to it is such that it only operates in low noise environments due to the passive localization.

SUMMARY OF THE INVENTION

The working name of the concept underlying the present invention is Blind Signal Extraction (BSE). While the illustrations and the description includes speech enhancement as examples and embodiments thereof, the invention is not limited to speech enhancement per se, but also comprises detection and enhancement of electro magnetic signals as well as sound including vibrations and the like.

The adaptive operation of the BSE in accordance with the present invention relies on distinguishing one or more desired signal(s) from a mixture of signals if they are separated by some distinguishing parameter (measure), e.g. spatially or temporally, typically distinguishing by statistical properties, the shape of the statistical probability distribution functions (pdf), location in time or frequency etc of desired signals. Signals with different distinguishing parameters (measures), such as shape of the statistical probability distribution functions than the desired signals will be less favored at the output of the adaptive operation. The principle of source signal extraction in BSE is valid for any type of distinguishing parameters (measures) such as statistical probability distribution functions, provided that the parameters, such as the shape of the statistical distribution functions (pdf) of the desired signals is different from the parameters, such as the shape of the statistical probability distribution functions of the undesired signals. This implies that several parallel BSE structures can be implemented in such a manner that several source signals with different parameters, such as pdf's may be extracted simultaneously with the same inputs to sensors in accordance with the present invention.

The present invention aims to solve for instance problems such as fully automatic speech extraction where sensor and source inter-geometry is unknown and changing; the number of speech sources is unknown; surrounding noise sources have unknown spectral properties; sensor characteristics are non-ideal and change due to ageing; complexity restrictions; needs to operate also in high noise scenarios, and other problems mentioned. Hence, in the case of speech extraction, the present invention provides a method and an apparatus that extracts all distinct speech source signals based only on speaker independent speech properties (shape of statistical distribution).

The BSE of the present invention provides a handful of desirable properties such as being an adaptive algorithm; able to operate in the time selectivity domain and/or the spatial domain and/or the temporal domain; able to operate on any number (>0) of transducers/sensors; its operation does not rely on signal activity detection. Moreover, a-priori knowledge of source and/or sensor inter-geometries is not required for the operation of the BSE, and its operation does not require a calibrated transducer/sensor array. Another desirable property of the BSE operation is that is does not rely on statistical independence of the sources or statistical de-correlation of the produced output.

Furthermore, the BSE does not need any pre-recorded array signals or parameter estimates extracted from the actual environment nor does it rely on any signals or parameter estimates extracted from actual sources. The BSE can operate successfully in positive as well as negative SNIR (signal-to-noise plus interference ratio) environments and its operation includes de-reverberation of received signals.

To accomplish the aforementioned and other advantages, the present invention sets forth an adaptive method of extracting at least one of desired electro magnetic wave signals, sound wave signals or any other signals and suppressing noise and interfering signals to produce enhanced signals from a mixture of signals. The method thus comprises the steps of:

the at least one of continuous-time, and correspondingly discrete-time, desired signals being predetermined by one or more distinguishing parameters, such as statistical properties, the shape of their statistical probability density functions (pdf), location in time or frequency;

the desired signal's parameter(s) differing from the noise or interfering source signals parameter(s);

received signal data from the desired signals, noise and interfering signals being collected through at least one suitable sensor means for that purpose, sampling the continuous-time, or correspondingly utilize the discrete-time, input signals to form a time-frame of discrete-time input signals;

transforming the signal data into a set of sub-bands;

at least one of attenuating for each time-frame of input signals in each sub-band for all mixed signals in such a manner that desired signals are attenuated less than noise and interfering signals, and amplifying for each time-frame of input signals in each sub-band for all mixed signals in such a manner that desired signals are amplified, and that they are amplified more than noise and interfering source signals;

updating filter coefficients for each time-frame of input signals in each sub-band so that an error criterion between the filtered input signals and the transformed output signals is minimized; and the sub-band signals being filtered by a predetermined set of sub-band filters producing a predetermined number of output signals each one of them favoring the desired signals on the basis of its distinguishing parameter(s); and reconstructing the output sub-band signals with an inverse transformation. Herein, the term "bandwidth" is typically referred to as a full bandwidth, but also includes a bandwidth a little narrower than a full bandwidth.

In one embodiment of the present invention, the transforming comprises a transformation such that signals available in their digital representation are subdivided into smaller, or equal, bandwidth sub-band signals.

In one embodiment of the present invention, the parameter for distinguishing between the different signals in the mixture is based on the pdf.

In another embodiment of the present invention the received signal data is converted into digital form if it is analog.

Another embodiment comprises that the output signals are converted to analog signals when required.

A further embodiment comprises that the output signal levels are corrected due to the change in signal level from the attenuation/amplification process.

Yet another embodiment comprises that the filter coefficient norms are constrained to a limitation between a minimum and a maximum value.

A still further embodiment comprises that a filter coefficient amplification is accomplished when the norms of the filter coefficients are lower than the minimum allowed value and a filter coefficient attenuation is accomplished when the norm of the filter coefficients are higher than a maximum allowed value.

Yet a still further embodiment comprises that the attenuation and amplification is leading to the principle where the filter coefficients in each sub-band are blindly adapted to enhance the desired signal in the time selectivity domain and in the temporal as well as the spatial domain.

Furthermore, the present invention sets forth an apparatus adaptively extracting at least one of desired electro magnetic wave signals, sound wave signals or any other signals and suppressing noise and interfering signals to produce enhanced signals from a mixture of signals. The apparatus thus comprises:

A set of non-linear functions that are adapted to capture predetermined properties describing the difference between the distinguishing parameter(s) of the desired signals and the parameter(s) of undesired signals, i.e., noise and interfering source signals;

at least one sensor adapted to collect signal data from desired signals, noise and interfering signals, sampling the continuous-time, or correspondingly utilize the discrete-time, input signals to form a time-frame of discrete-time input signals;

a transformer adapted to transform the signal data into a set of sub-bands;

an attenuator adapted to attenuate each time-frame of input signals in each sub-band for all signals in such a manner that desired signals are attenuated less than noise and interfering signals;

an amplifier adapted to amplify each time-frame of input signals in each sub-band for all signals in such a manner that desired signals are amplified, and that they are amplified more than noise and interfering signals;

a set of filter coefficients for each time frame of input signals in each sub-band, adapted to being updated so that an error criterion between the linearly filtered input signals and nonlinearly transformed output signals is minimized; and a filter adapted so that the sub-band signals are being filtered by a predetermined set of sub-band filters producing a predetermined number of the output signals each one of them favoring the desired signals given by the distinguishing parameter(s); and a reconstruction adapted to perform an inverse transformation to the output sub-band signals.

In an embodiment of the present invention, the transformer is adapted to transform said signal data such that signals available in their digital representation are subdivided into smaller, or equal, bandwidth sub-band signals.

It is appreciated that the apparatus is adapted to perform embodiments relating to the above described method, as is apparent from the attached set of dependent apparatus claims.

The BSE is henceforth schematically described in the context of speech enhancement in acoustic wave propagation where speech signals are desired signals and noise and other interfering signals are undesired source signals.

BRIEF DESCRIPTION OF THE DRAWINGS

Henceforth reference is had to the accompanying drawings together with given examples and described embodiments for a better understanding of the present invention, wherein:

FIG. 1 schematically illustrates two scenarios for speech and noise in accordance with prior art;

FIG. 2*a-c* schematically illustrate an example of time selectivity in accordance with prior art;

DETAILED DESCRIPTION OF PREFERRED EMBODIMENTS

Figure 3:
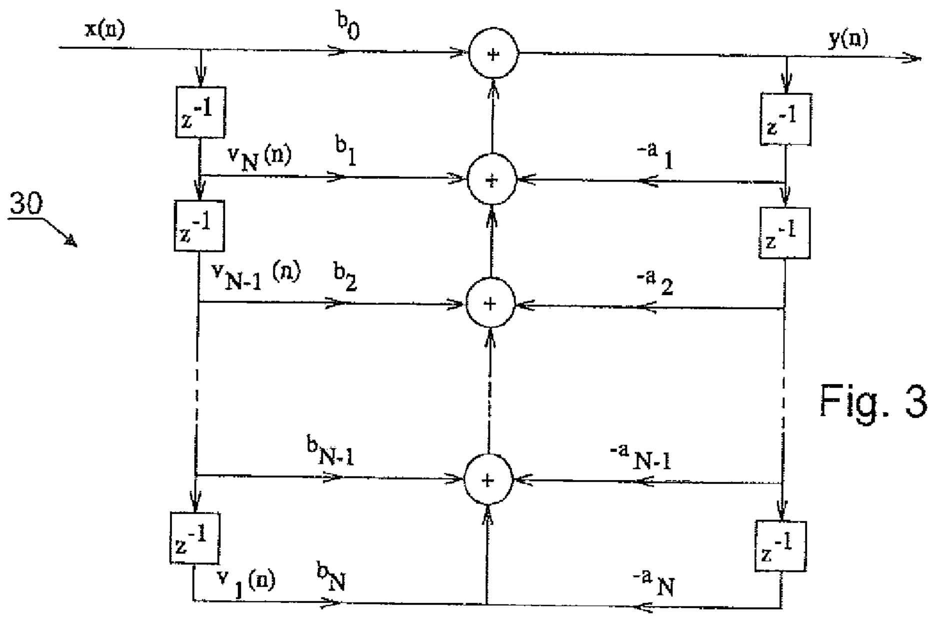
FIG. 3 schematically illustrates an example of how temporal selectivity is handled by utilizing a digital filter in accordance with prior art.

The present invention describes the BSE (Blind Signal Extraction) according to the present invention in terms of its fundamental principle, operation and algorithmic parameter notation/selection. Hence, it provides a method and an apparatus that extracts all desired signals, exemplified as speech sources in the attached Fig's, based only on the differences in the shape of the probability density functions between the desired source signals and undesired source signals, such as noise and other interfering signals.

The BSE provides a handful of desirable properties such as being an adaptive algorithm; able to operate in the time selectivity domain and/or the spatial domain and/or the temporal domain; able to operate on any number (>0) of transducers/sensors; its operation does not rely on signal activity detection. Moreover, a-priori knowledge of source and/or sensor inter-geometries is not required for the operation of the BSE, and its operation does not require a calibrated transducer/sensor array. Another desirable property of the BSE operation is that is does not rely on statistical independence of the source signals or statistical de-correlation of the produced output signals.

Furthermore, the BSE does not need any pre-recorded array signals or parameter estimates extracted from the actual environment nor does it rely on any signals or parameter estimates extracted from actual sources. The BSE can operate successfully in positive as well as negative SNIR (signal-to-noise plus interference ratio) environments and its operation includes de-reverberation of received signals.

There exits numerous of applications for the BSE method and apparatus of the present invention. The BSE operation can be used for different signal extraction applications. These include, but are not limited to signal enhancement in air acoustic fields for instance personal telephones, both mobile and stationary, personal radio communication devices, hearing aids, conference telephones, devices for personal communication in noisy environments, i.e., the device is then combined with hearing protection, medical ultra sound analysis tools.

Another application of the BSE relates to signal enhancement in electromagnetic fields for instance telescope arrays, e.g. for cosmic surveillance, radio communication, Radio Detection And Ranging (Radar), medical analysis tools.

A further application features signal enhancement in acoustic underwater fields for instance acoustic underwater communication, SOund Navigation And Ranging (Sonar).

Additionally, signal enhancement In vibration fields for instance earthquake detection and prediction, volcanic analysis, mechanical vibration analysis are other possible applications.

Another possible field of application is signal enhancement in sea wave fields for instance tsunami detection, sea current analysis, sea temperature analysis, sea salinity analysis.

FIG. 1 schematically illustrates two scenarios for speech and noise in accordance with prior art. The FIG. 1 upper half depicts a source of sound 10 (person) recorded by a microphone/sensor/transducer 12 from a short distance and mixed with noise, indicated as an arrow pointing at the microphone 12. Hence, speech+noise is recorded by the microphone 12, and the signal to noise ratio (SNR) equals SNR=x [dB].

The lower half of FIG. 1 depicts a person 10 as sound source to be recorded, extracted, at a distance R from the microphone/sensor/transducer 12. Now the recorded sound is $\alpha\cdot$ speech+noise where $\alpha^2$ is proportional to $1/R^2$, and the SNR equals $x+10\cdot\log_{10}\alpha^2$ [dB].

FIG. 2*a-c* schematically illustrates different examples of time selectivity in accordance with prior art. A microphone 12 is observing x(t) which contains a desired source signal added with noise. FIG. 2*a* illustrates a switch 14 which may be switched on in the presence of speech and it may be switched off in all other time periods. FIG. 2*b* illustrates a multiplicative function $\alpha(t)$ which may take on any value between 1 and 0. This value can be controlled by the activity pattern of the speech signal and thus it becomes an adaptive soft switch.

FIG. 2*c* illustrates a filter-bank transformation prior to a set of adaptive soft switches where each switch operates on its individual narrowband sub-band signal. The resulting sub-band outputs are then reconstructed by a synthesis filter-bank to produce the output signal.

FIG. 3 schematically illustrates an ex-ample of how temporal selectivity, i.e., signals with different periodicity in time are treated differently, is handled by utilizing a digital filter 30 in accordance with prior art. The filter applies the unit delay operator, denoted by the symbol $z^{-1}$. When applied to a sequence of digital values, this operator provides the previous value in the sequence. It therefore in effect introduces a delay of one sampling interval. Applying the operator $z^{-1}$ to an input value ($x_n$) gives the previous input ($x_{n-1}$). The filter output y(n) is described by the formula in FIG. 3. By appropriate selection of the parameters $a_k$ and $b_k$ the properties of the digital filter are defined.

Figure 4A:
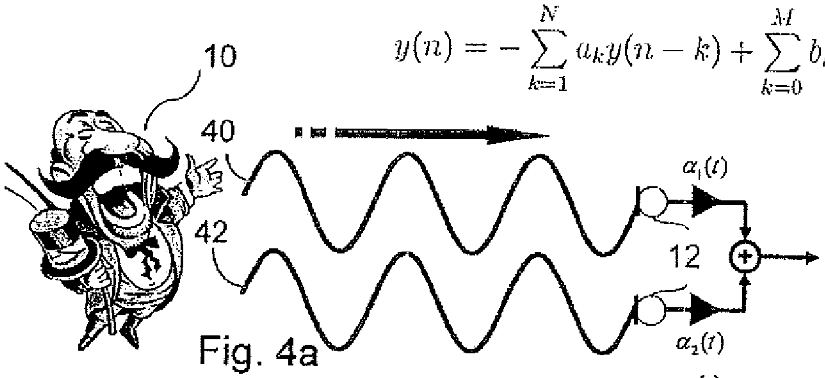
FIGS. 4*a* and 4*b* schematically illustrate spatial selectivity in accordance with prior art.
Figure 5A:
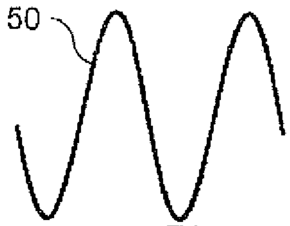
FIGS. 5*a* and 5*b* schematically illustrates two resulting signals according to the spatial selectivity of FIGS. 4*a* and 4*b*.
Figure 4B:
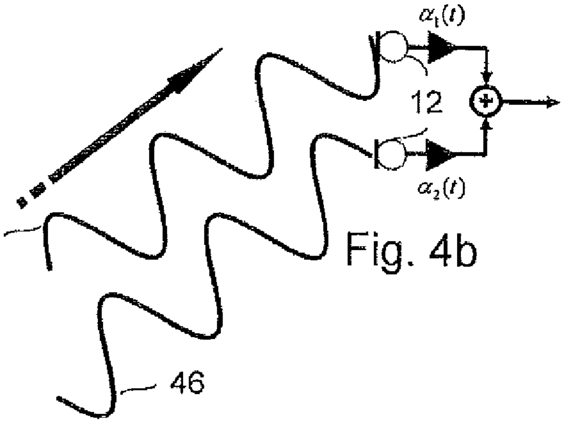
Figure 5B:
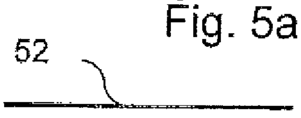

FIGS. 4*a* and 4*b* schematically illustrate problems related to spatial selectivity in accordance with prior art, and FIGS. 5*a* and 5*b* schematically illustrate two resulting signals according to the spatial selectivity of FIGS. 4*a* and 4*b*.

The arrows in FIGS. 4*a* and 4*b* indicate the propagation of two identical waves 40, 42 in the direction from a source of signals in front of two microphones 12 and two identical waves 44, 46 in an angle to the microphones 12. In FIG. 4*a* the waves in a spatial direction in front of the microphones are in phase. As the waves 40, 42 are in phase and transmitted from the same distance at the same frequency; the amplitude of the collected signal adds up to the sum of both amplitudes, herein providing an output signal of twice the amplitude of waves 40, 42 as is depicted in FIG. 5*a*.

The two waves 44, 46 in FIG. 4*b* are also in phase, but have to travel half a wave lengths difference to reach each microphone 12 thus canceling each other when added as is depicted in FIG. 5*b*.

This simple example of FIG. 4*a*-4*b*, and FIG. 5*a*-5*b* provides a glance of the difficulties encountered when a wanted signal is extracted. A real life problem with for instance speech and noise, temporal and time selectivity, different distances from sources to microphones 12 and multiple frequencies indicates how extremely difficult and important it is to provide a BSE method, which does not need any pre-recorded array signals or parameter estimates extracted from the actual environment nor does it rely on any signals or parameter estimates extracted from actual sources.

Figure 6:
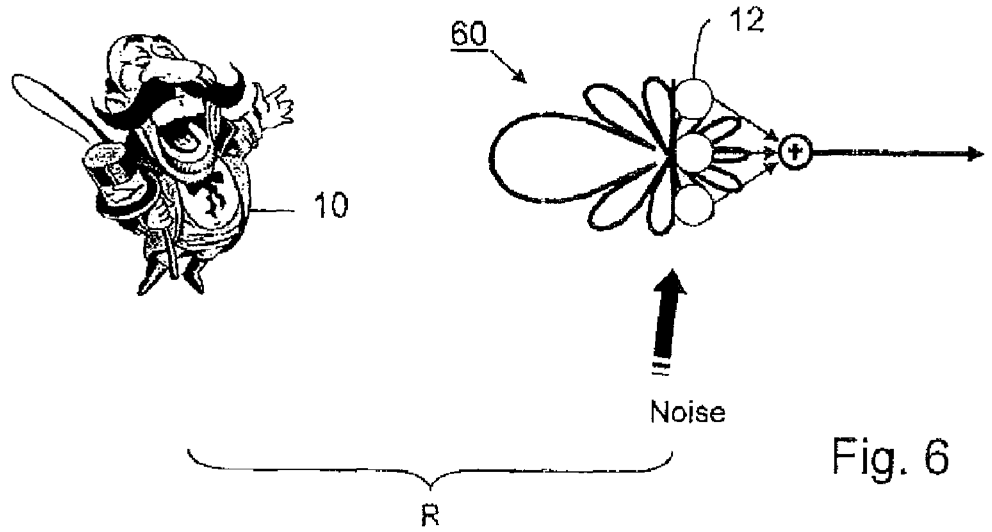
FIG. 6 schematically illustrates how sound signals are spatially collected by three microphones in accordance with prior art.

FIG. 6 schematically illustrates how sound signals are spatially collected by three microphones from all directions where the microphones 12 pick up signals both from speech and noise in all the domains mentioned.

Figure 7:
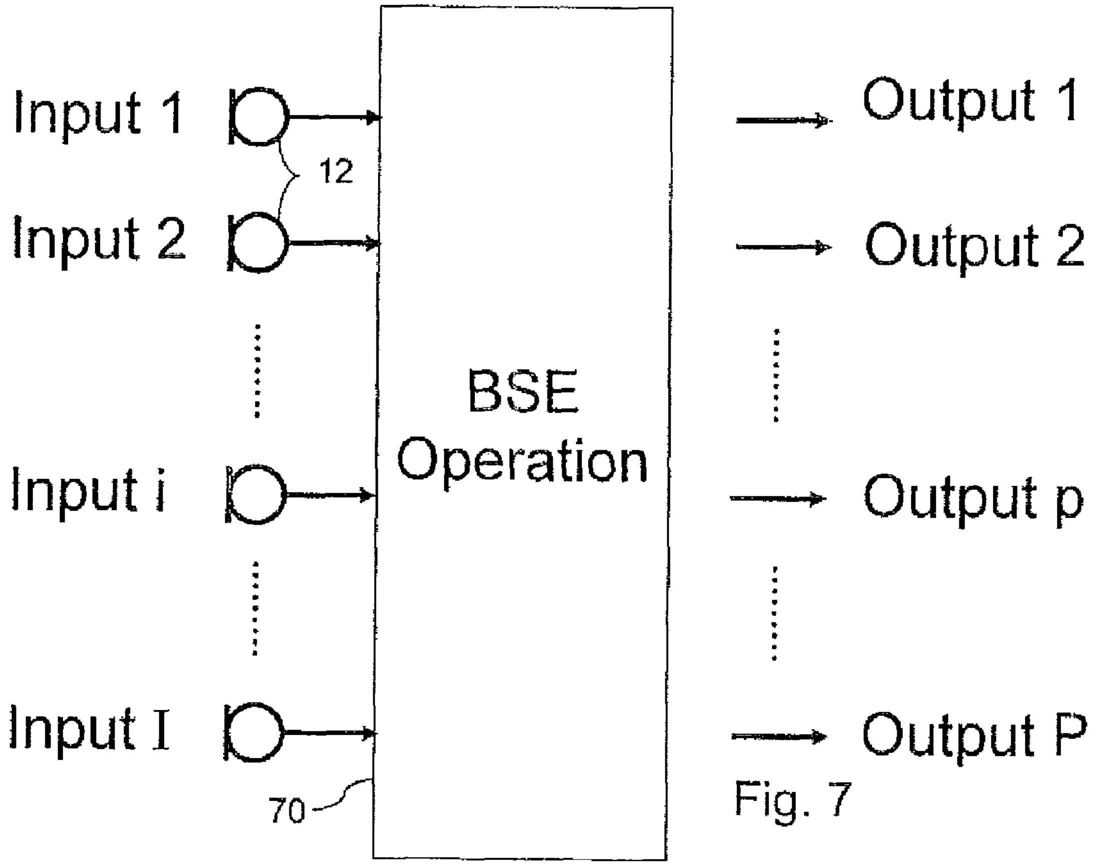
FIG. 7 schematically illustrates a blind Signal Extraction time-frame schema overview according to the present invention.

Now with reference to FIG. 7, this is schematically illustrating a blind signal extraction time-frame scheme overview according to the present invention. The BSE 70 operates on number "I" input signals, spatially sampled from a physical wave propagating field using transducers/sensors/microphones 12, creating a number P output signals which are feeding a set of inverse-transducers/inverse-sensors such that another physical wave propagating field is created. The created wave propagating field is characterized by the fact that desired signal levels are significantly higher than signal levels of undesired signals. The created wave propagation field may keep the spatial characteristics of the originally spatially sampled wave propagation field, or it may alter the spatial characteristics such that the original sources appear as they are originating from different locations in relation to their real physical locations.

The BSE 70 of the present invention operates as described below, whereby one aim of the Blind Signal Extraction (BSE) operation is to produce enhanced signals originating, partly or fully, from desired sources with corresponding probability density functions (pdf:s) while attenuating or canceling signals originating, partly or fully, from undesired sources with corresponding pdf:s. A requirement for this to occur is that the undesired pdf's shapes are different than the shapes of the desired pdf's.

Figure 8:
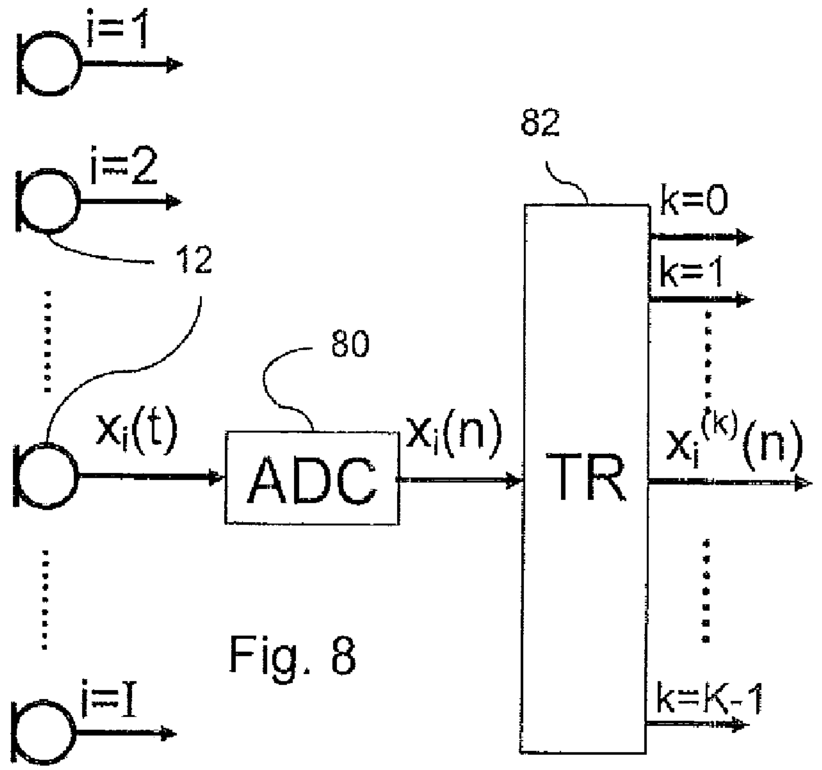
FIG. 8 schematically illustrates a signal decomposition time-frame scheme according to the present invention.
Figure 9:
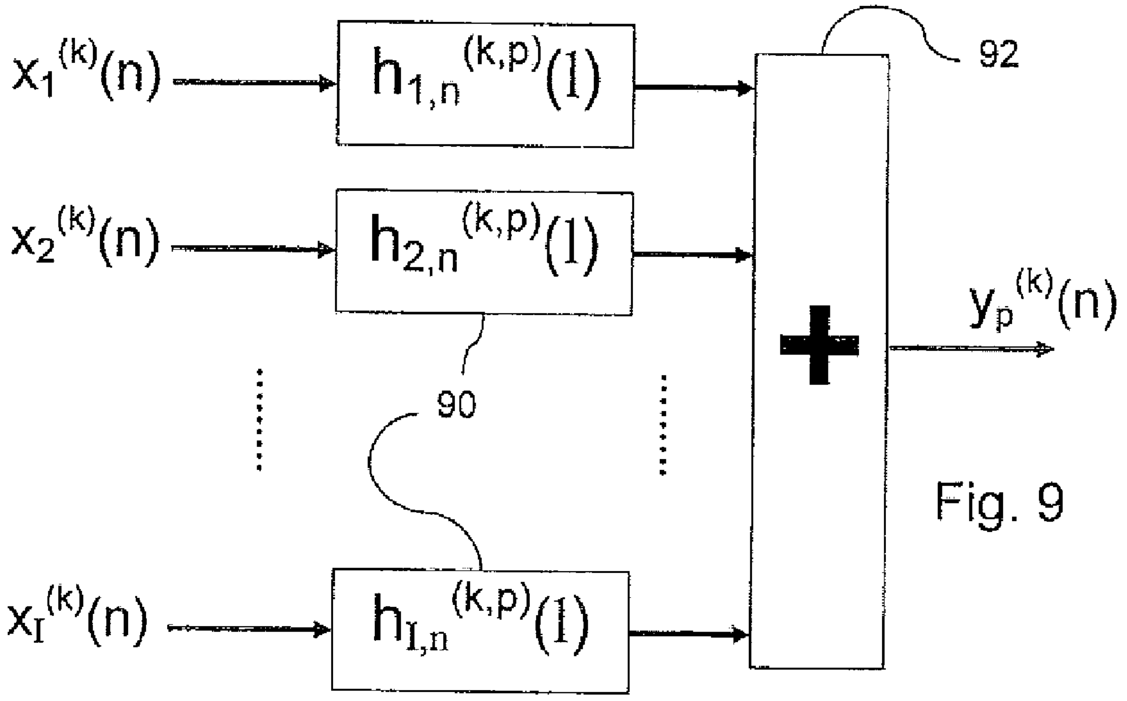
FIG. 9 schematically illustrates a filtering performed to produce an output in the transform domain according to the present invention.

FIG. 8 schematically illustrates a signal decomposition time-frame schema according to the present invention. The received data x(t) is collected by a set of transducers/sensors 12. When the received data is analog in nature it is converted into digital form by analog-to-digital conversion (ADC) 12 (this is accomplished in step 1 in the method/process/algorithm described below). The data is then transformed into sub-bands $x_i^{(k)}$ (n) by a transformation, step 2 in the process described below. This transformation 82 is such that the signals available in the digital representation are subdivided into smaller (or equal) bandwidth sub-band signals $x_i^{(k)}$ (n). These sub-band signals are correspondingly filtered by a set of sub-band filters 90 producing a number of added 92 sub-band signals output signals $y_P^{(k)}$ (n) where each of the output signals favor signals with a specific pdf shape, step 3-9 in the process described below.

Figure 10:
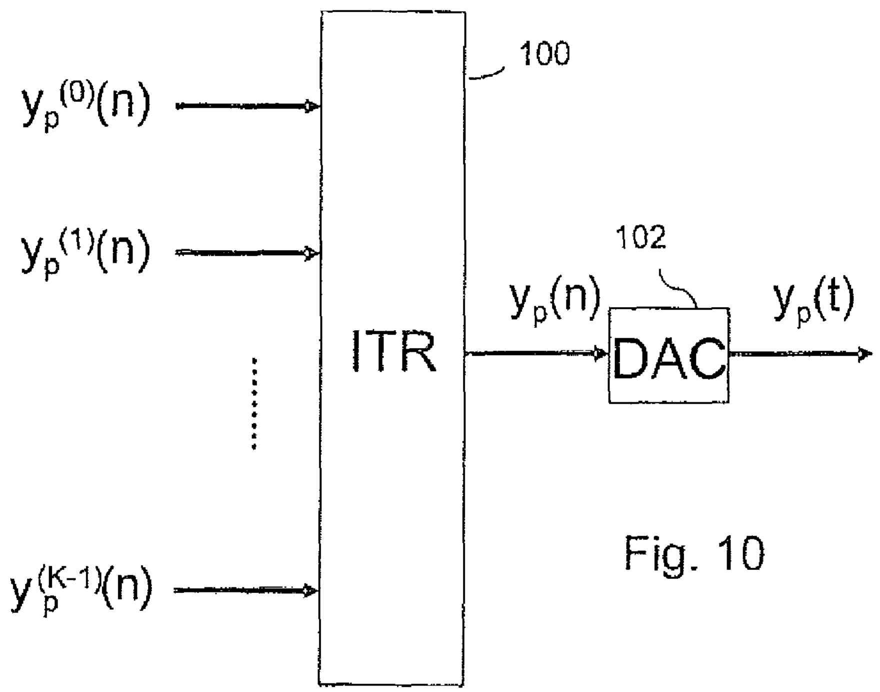
FIG. 10 schematically illustrates an inverse transform to produce an output according to the present invention.

As depicted in FIG. 10, these output signals $y_P^{(k)}$ (n) are reconstructed by an inverse transformation 100, step 10 in the below described process. When analog signals are required a digital-to-analog conversion (DAC) 102 is performed, step 11 in the below described process.

Figure 11:
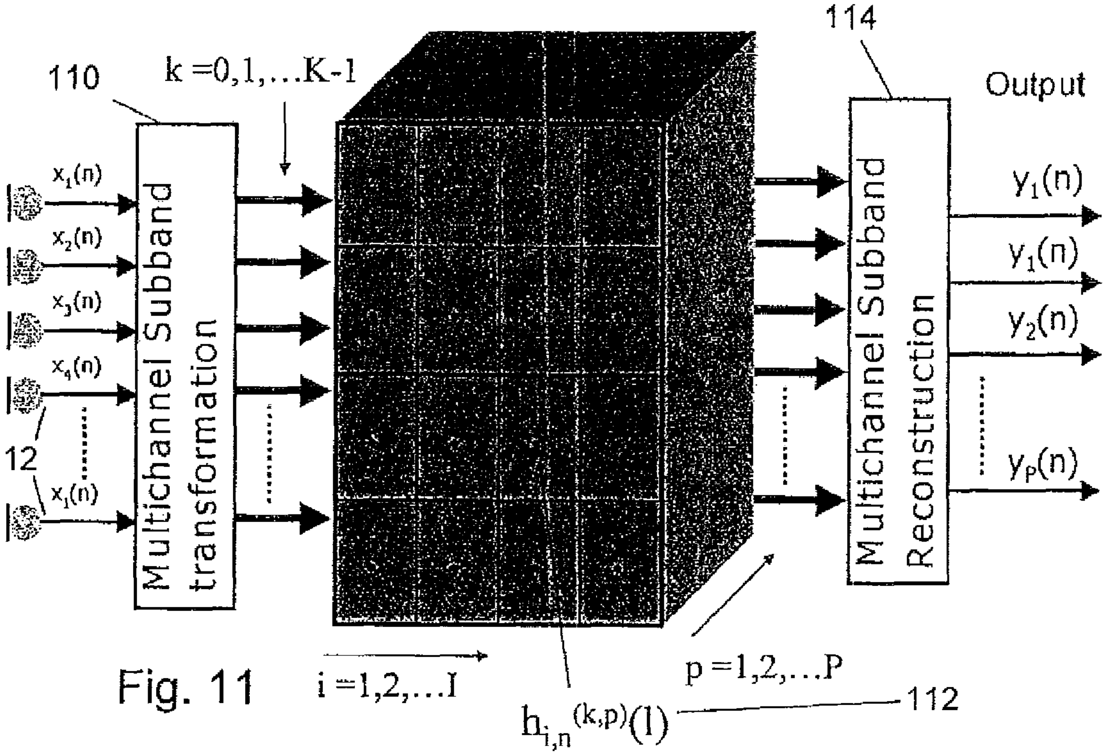
FIG. 11 schematically illustrates time, temporal, and spatial selectivity by utilizing an array of filter coefficients according to the present invention.

The core of operation, as the provided example through FIG. 11, is that at each step, i.e. for each time-frame of input data 110, following a multi channel sub-band transformation step, the filter coefficients 112, shown as an array of filter coefficients, are updated in each sub-band such that all signals are attenuated and/or amplified. In 114, the output signals are reconstructed by an inverse transformation.

In the case when all signals are attenuated, it is accomplished in such a way that the signals with desired shape of the pdf's are attenuated less than all other signals. In the case when all signals are amplified, the signals with the desired shape of the pdf's are amplified more than all other signals. This leads to a principle where the filter coefficients in each sub-band are blindly adapted to enhance certain signals, in the time selectivity domain and in the temporal as well as the spatial domain, defined by the shape of their corresponding pdf's.

When the shapes of the undesired pdf's are significantly different from the desired signal's pdf's, then the corresponding attenuation/amplification is significantly larger. This leads to a principle where sources with pdf's farther from the desired pdf's are receiving more degrees of freedom (attention) to be altered. The attenuation/amplification is performed in step 3-4. When the output signals are created such that they are closer to the desired shape of the pdf's, the error criterion (step 4) will be smaller. The optimization is therefore accomplished to minimize the error criterion for each output signal. The filter coefficients are then updated in step 5. There is also a need to correct the level of the output signals due to the change in signal level from the attenuation/amplification process. This is performed in step 6 and 7. Since each sub-band is updated according to the above described method it automatically leads to a spectral filtering, where sub-bands with larger contribution of undesired signal energy are attenuated more.

If the filter coefficients are left unconstrained they may possibly drop towards zero or they may grow uncontrolled. It is therefore necessary to constrain the filter coefficients by a limitation between a minimum and a maximum norm value. For this purpose there is a filter coefficient amplification made when the filter coefficient norms are lower than a minimum allowed value (global extraction) and a filter coefficient attenuation made when the norm of the filter coefficients are higher than a maximum allowed value (global retraction). This is performed in step 8 and 9 in the algorithm.

The constants utilized in the BSE method/process of the present invention are:

I—denoting the number of transducers/sensors available for the operation (indexed by i)

K—denoting the number of transformed sub-band signals (indexed by k)

P—denoting the number of produced output signals (indexed by p)

n—denoting a discretized time index (i.e. real time t=nT, where T is the sampling period)

$L_f$—denoting the length of each sub-band filter $Level_p$—denoting a level correction term used to maintain a desired output signal level for output no. p $\lambda_1$ and $\lambda_2$—denotes filter coefficient update weighting parameters $C_1$—denotes a lower level for global extraction $C_2$—denotes an upper level for global retraction Functions utilized are:

$f_P^{(k)}(\bullet)$—denotes a set of non-linear functions $g_1^{(k,p)}(\bullet)$—denotes a set of level increasing functions $g_2^{(k,p)}(\bullet)$—denotes a set of level decreasing functions Variables utilized are:

$h_{i,n}^{(k,p)}(l)$—denotes a sequence (filter) of length $L_i$ of coefficients, valid at the time instant n $\tilde{h}_{i,n}^{(k,p)}(l)$—denotes an intermediate sequence (filter) of length $L_i$ of coefficients, valid at the instant n $\Delta h_{i,n}^{(k,p)}(l)$—denotes a sequence of length $L_i$ of (correction) coefficients, valid at time instant n $\Delta\tilde{h}_{i,n}^{(k,p)}(l)$—denotes an intermediate sequence of length $L_i$ of (correction) coefficients, valid at time instant n Signals are denoted by:

The received transducer/sensor input signals $$x_i(t),\ i=1, \ldots I$$

The sampled transducer/sensor input signals $$x_i(n),\ i=1, \ldots I$$

The transformed sampled subband input signals $$x_i^{(k)}(n),\ i=1, \ldots I.\ k=0, \ldots K-1$$

The transforms used here can be any frequency selective transform e.g. a short-time windowed FFT, a Wavelet transform, a subband filterbank transform etc.

The transformed sampled subband output signals $y_p^{(k)}(n), p=1, \ldots P, k=0, \ldots K-1$ Intermediate signal:

$\tilde{y}_p^{(k)}(n), p=1, \ldots P, k=0, \ldots K-1$

The inverse-transformed output sampled signals $y_p(n), p=1, \ldots P$

The inverse-transforms used here are the inverse of the transform used to transform the input signals The continuous-time output signals $y_p(t), p=1, \ldots P$ The following method/process steps typically define the BSE of the present invention:

1. ∀i, Sample the continuous-time input signals $x_i(t)$ to form a set of the discrete-time input signals $x_i(n)$
2. ∀i. Transform the input signals $x_i(n)$ to form K subband signals $x_i^{(k)}(n)$
3. ∀p, ∀k, compute the intermediate subband output signals:

$$\tilde{y}_p^{(k)}(n) = \sum_{i=1}^{I} \sum_{l=0}^{L_f-1} x_i^{(k)}(n-l) h_{i,n-1}^{(k,p)}(l)$$

4. ∀p, ∀k, compute the correction terms (where ||•|| denotes any mathematical norm):

$$\Delta h_{i,n}^{(k,p)}(\cdot) = \underset{\Delta \tilde{h}_{i',n}^{(k,p)}(\cdot)}{\arg\min} \left\| \sum_{i'=1}^{I} \sum_{l=0}^{L_{i'}-1} x_{i'}^{(k)}(n-l)\left(h_{i',n-1}^{(k,p)}(l) + \Delta \tilde{h}_{i',n}^{(k,p)}(l)\right) - f_p^{(k)}(\tilde{y}_p^{(k)}(n)) \right\|$$

5. Update the filters ∀k, ∀i, ∀p, ∀l $\tilde{h}_{i,n}^{(k,p)}(l)=\lambda_1 h_{i,n-1}^{(k,p)}(l)+\lambda_2 \Delta h_{i,n}^{(k,p)}(l)$ 6. Calculate ∀p (where ||•|| denotes any mathematical norm)

$$Level_P = \frac{1}{\|\tilde{h}_{i,n}^{(k,p)}(l)\|_{\forall k, \forall l}} \quad i \in [1, 2, \ldots I]$$

7. Calculate the output ∀k, ∀p $$y_p^{(k)}(n) = Level_P \sum_{i=1}^{I} \sum_{l=0}^{L_i-1} x_i^{(k)}(n-l) \tilde{h}_{i,n}^{(k,p)}(l)$$

8. ∀p, IF $\|\tilde{h}_{i,n}^{(k,p)}(l)\|_{\forall k, \forall i, \forall l} \leqq C_1$, (global extraction)

$h_{i,n}^{(k,p)}(l)=g_1^{(k,p)}(\tilde{h}_{i,n}^{(k,p)}(l)) \forall l, \forall k, \forall i$ 9. ∀p, IF $\|\tilde{h}_{i,n}^{(k,p)}(l)\|_{\forall k, \forall i, \forall l} \geqq C_2$(global retraction)

$h_{i,n}^{(k,p)}(l)=g_2^{(k,p)}(\tilde{h}_{i,n}^{(k,p)}(l)) \forall l, \forall k, \forall i$ 10. ∀p, IF $C_1 < \|\tilde{h}_{i,n}^{(k,p)}(l)\|_{\forall k, \forall i, \forall l} < C_2$ $h_{i,n}^{(k,p)}(l)=\tilde{h}_{i,n}^{(k,p)}(l) \forall l, \forall k, \forall i$ 11. ∀p, Inverse-transform the subband output signals $y_p^{(k)}(n)$ to form a time frame of the output signals $y_p(n)$
12. ∀p, Reconstruct the continuous-time output signals, $y_p(t)$ via a digital-to-analog conversion (DAC)

Figure 13:
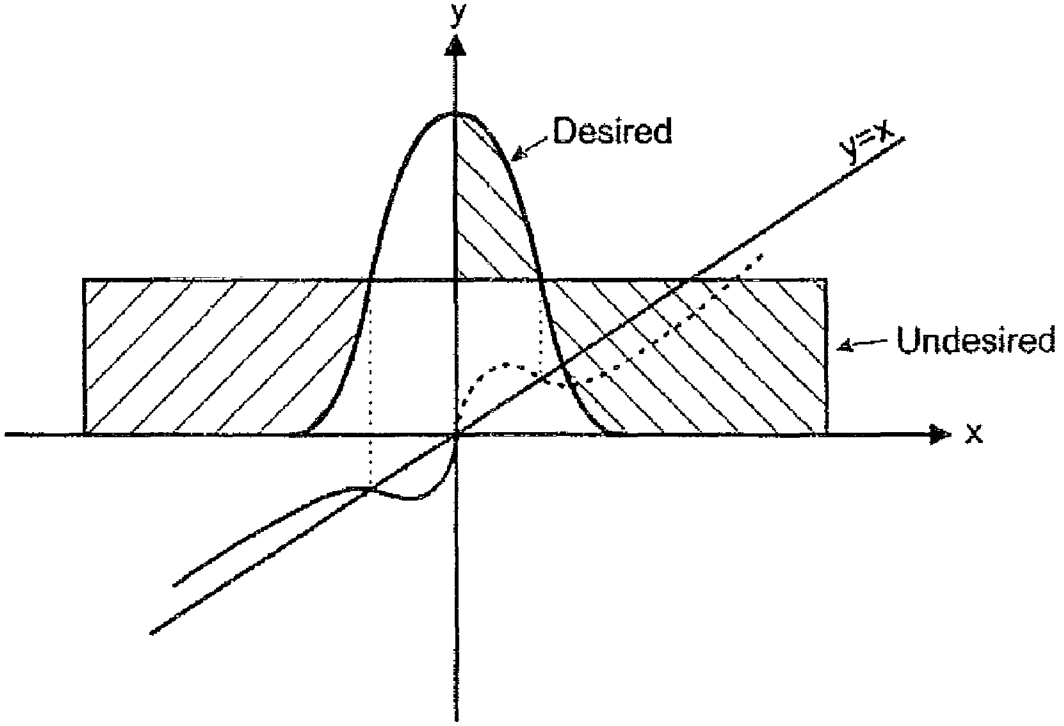
FIG. 13 schematically illustrates a graphical diagram of filtering desired signals in accordance with the present invention.

The above steps are additionally described in words (See FIG. 13 illustrating section 4):

1. All input signals are converted from analog to digital form if needed.
2. All input signals are transformed into one or more sub-bands.
3. The subband input signals are filtered with the filter coefficients obtained in the last iteration (i.e. at time instant n−1) to form an intermediate output signal for each sub-band k, for all outputs p.
4. This step performs a linearization process. Individually, for every sub-band k and for every output p, a set of correction terms are found such that the norm difference between a linear filtering of the subband input signals and the non-linearly transformed intermediate output signals is minimized. The non-linear functions are chosen such that output samples, that predominantly occupies levels which is expected from desired signals, are passed with higher values (levels) than output samples that predominantly occupies levels which is expected from undesired signals. It should be noted that if the non-linear function is replaced by the linear function, $f_p^{(k)}(x)=x$, then the optimal correction terms would always be equal to zero, independently of the input signals.
5. The correction terms are weighted (with $\lambda_2$) and added to the weighted (with $\lambda_1$) coefficients obtained in the last iteration to form the new set of intermediate filters, for every subband k, every channel i, every output p and for every parameter index l.
6. Since the linearization process may alter the level of the output signals the inverse of the filter norms are calculated, for subsequent use.
7. The subband output signals are calculated by filtering the input signals with the current (i.e. at time instant n) intermediate filter and multiplied with the inverse of the filter norms, for every subband k and for every output index p.
8. Individually for every output index p, if the total norm of the combined coefficients spanning all k, i, l falls below (or equals) the level $C_1$, then a global extraction is performed to create the current filters (i.e. at time instant n) by passing the current, intermediate filters through the extraction functions.
9. Individually for every output index p, if the total norm of the combined coefficients spanning all k, i, l exceeds (or equals) the level $C_2$, then a global retraction is performed to create the current filters (i.e. at time instant n) by passing the current intermediate filters through the retraction functions.
10. Individually for every output index p, if the total norm of the combined coefficients spanning all k, i, l falls between the level $C_1$ and $C_2$, then the current filters (i.e. at time instant n) are equal to the intermediate filters.
11. Individually for every p, the subband output signals are inverse-transformed to form the output signals.
12. Individually for every p, the continuous-time output signals are formed via digital-to-analog conversion.

Requirements and Settings

1. The choice of non-linear functions $f_p^{(k)}(\bullet)$ depends on the statistical probability density functions of the desired signals, in the particular sub-band k. Assume that we have a number (R) of zero mean stochastic signals, $s_r(t)$, r=1, 2, . . . R, with the corresponding probability density functions $p_{x_r}(\tau)$, with the corresponding variance $\sigma_r^2$, then the non-linear functions should fulfill (if it exists)

$$\sigma_r^2 = \int_{-\infty}^{\infty} \tau^2 p_{x_r}(\tau) d\tau > < \int_{-\infty}^{\infty} f_p^{(k)}(\tau)^2 p_{x_r}(\tau) d\tau,$$

$$\forall r, \forall k, \sigma_T^2 \in \Theta$$

This requirement means that all functions $f_p^{(k)}(\bullet)$ acts to reduce (when>) or increase (when<) the power (variance) of all signals.

Without loss of generality we assume that the pdf corresponding to the single first signal is the desired pdf, i.e. $p_{x_r}(\tau)$, at the first output, $y_1(t)$. Then it is required that $$\int_{-\infty}^{\infty} f_1^{(k)}(\tau)^2 p_{x_1}(\tau) d\tau > \int_{-\infty}^{\infty} f_1^{(k)}(\tau)^2 p_{x_r}(\tau) d\tau,$$

$$r \in [2, 3, \ldots R], \forall k, \sigma_r^2 \in \Theta$$

More generally, if we wish to produce source signal no. s at output no. j the non-linear function $f_j^{(k)}(\bullet)$. $\forall$k needs to fulfill $$\int_{-\infty}^{\infty} f_j^{(k)}(\tau)^2 p_{x_s}(\tau) d\tau > \int_{-\infty}^{\infty} f_j^{(k)}(\tau)^2 p_{x_r}(\tau) d\tau,$$

$$r \in [1, 2, \ldots s-1, s+1, \ldots R], \sigma_r^2 \in \Theta$$

These requirements means that the level of power (variance) reduction, caused by the non-linear functions, are such that the undesired signals are reduced the most.

It should be noted that the above requirements cannot be fulfilled in general for any input variance $\sigma_r^2$. In this case the set $\Theta$ of allowed values for the variance can be reduced or one can choose different non-linear functions, $f_p^{(k)}(\bullet)$, for different input variances.

Typically for an acoustic environment, where the desired source signal is human speech, the non-linear function may be in the form of $f_p^{(k)}(x)=\alpha_1 \tan h(\alpha_2 x)$.

2. Requirement:

$$\frac{dg_1^{(k,p)}}{dx} > 1,$$

$\forall$x, typical choice $g_1^{(k,p)}(x)=(1+\alpha)x$, $\alpha>0$

3. Requirement:

$$\frac{dg_2^{(k,p)}}{dx} < 1,$$

$\forall$x, typical choice $g_2^{(k,p)}(x)=(1-\alpha)x$, $1>\alpha>0$

Initialization and Parameter Selection

The filters $h_{i,n}^{(k,p)}(l)$, $\forall$k, $\forall$p may be initialized (i.e. n=0) as $h_{i,0}^{(k,p)}(l)=1$, for $l=0$, $i \in [1, 2 \ldots I]$ $h_{i,0}^{(k,p)}(l)=0$, for all other $l$ and $i$ The parameters may in one non limiting exemplifying embodiment of the present invention be chosen according to:

Typically:

$1 \leqq K \leqq 1024$

Typically:

$1 \leqq L_i \leqq 64$

Typically:

$0.01 \leqq \alpha \leqq 0.1$

Typically:

$0<\alpha_1<1$

Typically:

$0<\alpha_2<5$

Typically:

$0.001 \leqq C_1 \leqq 0.1$

Typically:

$0.1<C_2 \leqq 10$

Typically:

$0<\lambda_1<1$

Typically:

$0<\lambda_2 \leqq 1$

Hence, the present invention provides an apparatus 70 adaptively extracting at least one of desired electro magnetic wave signals, sound wave signals and any other signals from a mixture of signals and suppressing other noise and interfering signals to produce enhanced signals originating, partly or fully, from the source 10 producing the desired signals. Thereby, functions adapted to determine the statistical probability density of desired continuous-time, or correspondingly the discrete-time, input signals are comprised in the apparatus. The desired statistical probability density functions differ from the noise and interfering signals' statistical probability density functions.

Moreover, the apparatus comprises at least one sensor, adapted to collect signal data from the desired signals and noise and interfering signals. A sampling is performed, if needed, on the continuous-time input signals by the apparatus to form discrete-time input signals. Also comprised in the apparatus is a transformer adapted to transform the signal data into a set of sub-bands by a transformation such that signals available in its digital representation are subdivided into smaller (or equal) bandwidth sub-band signals.

There is also comprised in the apparatus an attenuator adapted to attenuate each time-frame of input signals in each sub-band for all signals in such a manner that desired signals are attenuated less than noise and interfering signals, and/or an amplifier adapted to amplify each time-frame of input signals in each sub-band for all signals in such a manner desired signals are amplified, and that they are amplified more than noise and interfering signals. The apparatus thus comprises a set of filter coefficients for each time-frame of input signals in each sub-band, adapted to being updated so that an error criterion between the linearly filtered input signals and non-linearly transformed output signals is minimized, and a filter adapted so that the sub-band signals are being filtered by a predetermined set of sub-band filters producing a predetermined number of the output signals each one of them favoring the desired signals, defined by the shape of their statistical probability density function. Finally, the apparatus comprises a reconstruction adapted to perform an inverse transformation to the output signals.

Figure 12A:
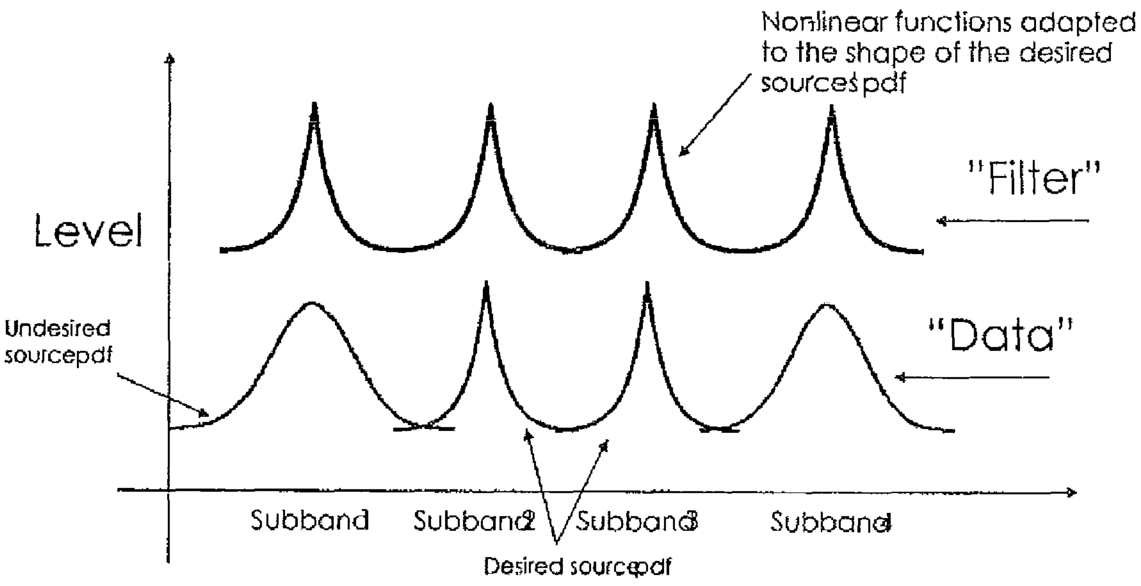
FIG. 12*a-c* schematically illustrates BSE graphical diagrams in the temporal domain of filtering desired signals' pdf:s from undesired signals' pdf:s in accordance with the present invention.
Figure 12B:
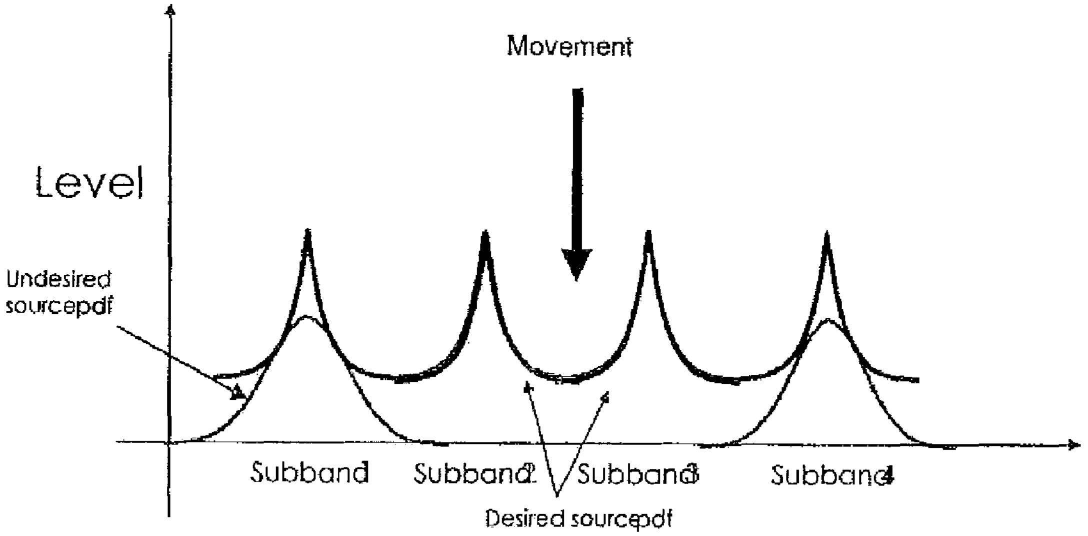
Figure 12C:
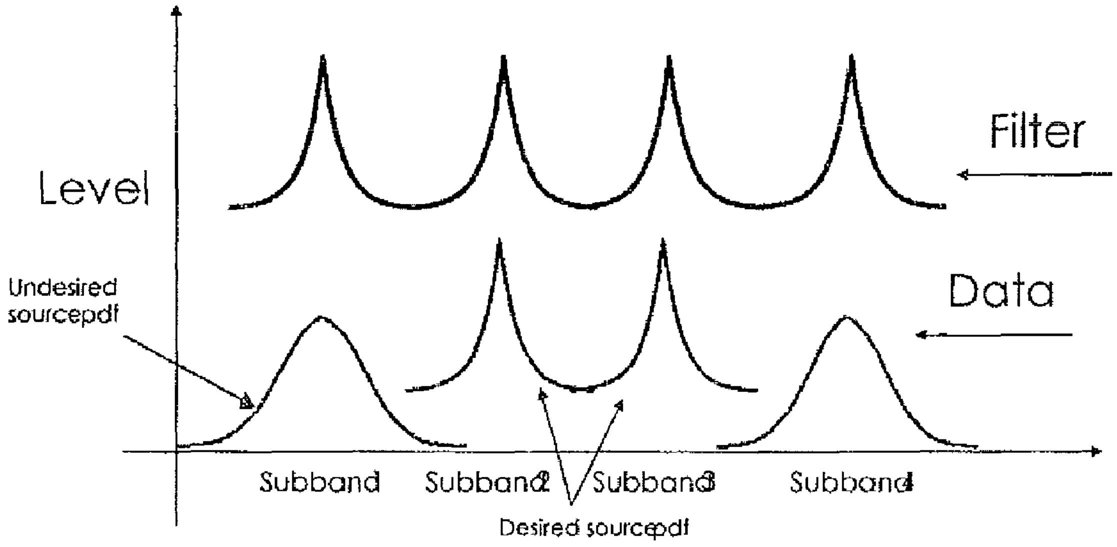

FIGS. 12*a-b-c* schematically illustrates a BSE graphical diagram in the temporal domain of filtering desired signals' pdf:s from undesired signals pdf:s in accordance with the present invention. The lower level of FIGS. 12*a-b-c* depicts incoming data through sub-bands 2 and 3 having a desired type of pdf and sub-bands 1 and 4 having an undesired type of pdf, which will be suppressed by the filter depicted in the upper level of FIGS. 12*a-b-c* when moved downwards in accordance with the above teaching.

The present invention has been described by given examples and embodiments not intended to limit the invention to those. A person skilled in the art recognizes that the attached set of claims sets forth other advantage embodiments.

The invention claimed is:

1. An adaptive method of extracting at least one of desired electro magnetic wave signals, sound wave signals, and any other signals from a mixture of signals and suppressing noise and interfering signals to produce enhanced signals corresponding to desired signals from a desired source, said method comprising the steps of:

said desired signals being predetermined by one or more parameters, wherein one of said one or more parameters is the shape of a statistical probability density functions (pdf) of said desired signals;

said one or more parameters of the desired signals distinguishing from parameters of said noise and interfering signals;

received signal data from said desired source and noise and interfering signals being collected through at least one sensor as continuous-time input signals, sampling said continuous-time input signals to form discrete-time input signals, or processing correspondingly discrete-time signals;

transforming said signal data into a set of sub-bands to create sub-band signals;

at least one of attenuating for each time-frame of input signals in each sub-band for all signals such that desired signals are attenuated less than noise and interfering signals and/or amplifying for each time-frame of input signals in each sub-band for all signals such that the desired signals are amplified, and that they are amplified more than noise and interfering signals;

updating filter coefficients for each time-frame of input signals in each sub-band so that an error criterion between the filtered input signals and transformed output signals is minimized; and said sub-band signals being filtered by a predetermined set of sub-band filters producing a predetermined number of output signals each one of them favoring said desired signals on the basis of the distinguishing parameters, wherein the parameter for distinguishing between the different signals in the mixture is based on the pdf; and reconstructing sub-band output signals with an inverse transformation.

2. A method according to claim 1, wherein said transforming comprises a transformation such that signals available in their digital representation are subdivided into smaller, or equal, bandwidth sub-band signals.

3. A method according to claim 1, wherein said received signal data is converted into digital form if it is analog.

4. A method according to claim 1, wherein said reconstructed sub-band output signals are converted to analog signals when required.

5. A method according to claim 1, wherein levels of said reconstructed sub-band output signals are corrected due to the change in signal level from said attenuation/amplification.

6. A method according to claim 1, wherein the norm of said filter coefficients is constrained to a limitation between a minimum allowed value and a maximum allowed value.

7. A method according to claim 6, wherein a filter coefficient amplification is accomplished when the filter coefficient norms are lower than said minimum allowed value and a filter coefficient attenuation is accomplished when the norm of the filter coefficients are higher than said maximum allowed value.

8. An apparatus adaptively extracting at least one of desired electro magnetic wave signals, sound wave signals, and any other signals from a mixture of signals and suppressing noise and interfering signals to produce enhanced signals corresponding to desired signals, comprising:

functions configured to determine one or more distinguishing parameters of at least one of continuous-time and/or correspondingly discrete-time, desired signals, wherein one of said distinguishing parameters is the shape of a statistical probability density functions (pdf) of said desired signals, said one or more distinguishing parameters differing from parameters of said noise and interfering signals;

at least one sensor configured to collect signal data from desired signals, noise and interfering signals, as continuous-time input signals, and configured to sample said continuous-time input signals to form a set of discrete-time input signals, or processing correspondingly discrete-time signals;

a transformer configured to transform said signal data into a set of sub-bands to create sub-band signals;

an amplifier and/or attenuator configured to amplify or attenuate each time-frame of input signals in each sub-band for all signals such that desired signals are amplified or attenuated, and that they are amplified more or less than noise and interfering signals;

a set of filter coefficients for each time-frame of input signals in each sub-band, configured to be updated so that an error criterion between the filtered input signals and transformed output signals is minimized; and a set of filter coefficients configured so that said sub-band signals are being filtered by a predetermined set of sub-band filters producing a predetermined number of sub-band output signals each one of them favoring desired signals defined by the distinguishing parameters, wherein the parameter for distinguishing between the different signals in the mixture is based on the pdf; and a reconstruction unit configured to perform an inverse transformation to said sub-band output signals.

9. An apparatus according to claim 8, wherein said transformer is configured to transform said signal data such that signals available in their digital representation are subdivided into smaller, or equal, bandwidth sub-band signals.

10. An apparatus according to claim 8, wherein said received signal data is configured to be converted into digital form if it is analog.

11. An apparatus according to claim 10, wherein said sub-band output signals are configured to be converted to analog signals when required.

12. An apparatus according to claim 11, wherein levels of said sub-band output signals are corrected due to the change in signal level from said attenuation/amplification.

13. An apparatus according to claim 11, wherein the norm of said filter coefficients is adaptively constrained to a limitation between a minimum allowed value and a maximum allowed value.

14. An apparatus according to claim 13, wherein a filter coefficient amplification is accomplished when the filter coefficient norms are lower than said minimum allowed value and a filter coefficient attenuation is accomplished when the norm of the filter coefficients are higher than the maximum allowed value.

* * * * *